L. P. BASSET.
ELECTRIC BATTERY.
APPLICATION FILED SEPT. 30, 1907.
913,936.
Patented Mar. 2, 1909.
2 SHEETS—SHEET 1.
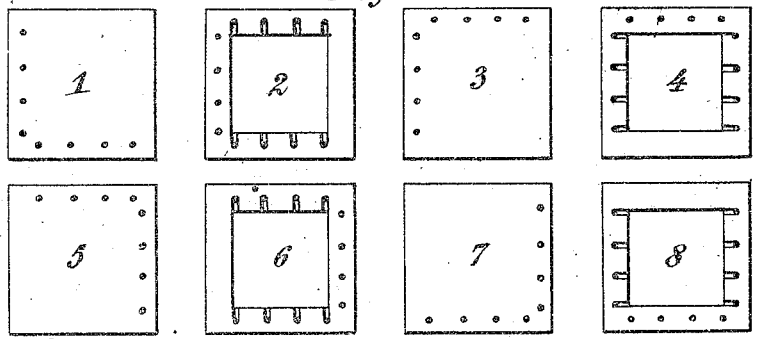
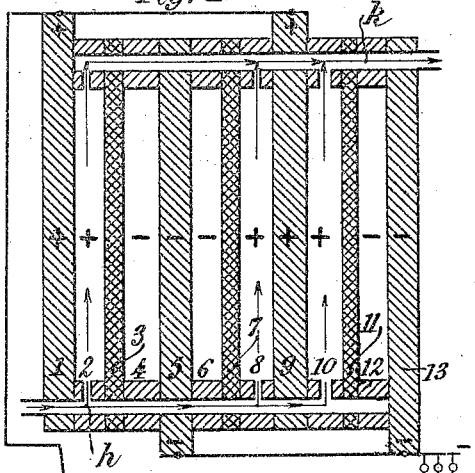
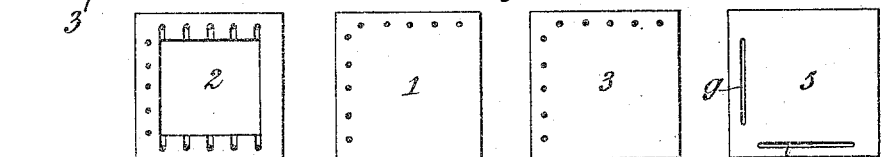
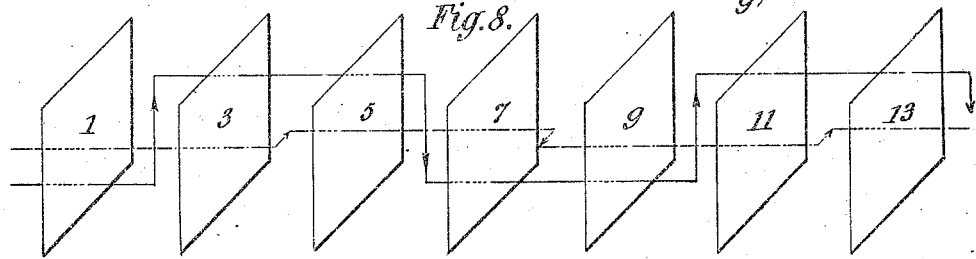
WITNESSES:
René Muine
William F. Martinez
INVENTOR:
Lucien Paul Basset
By Attorneys,

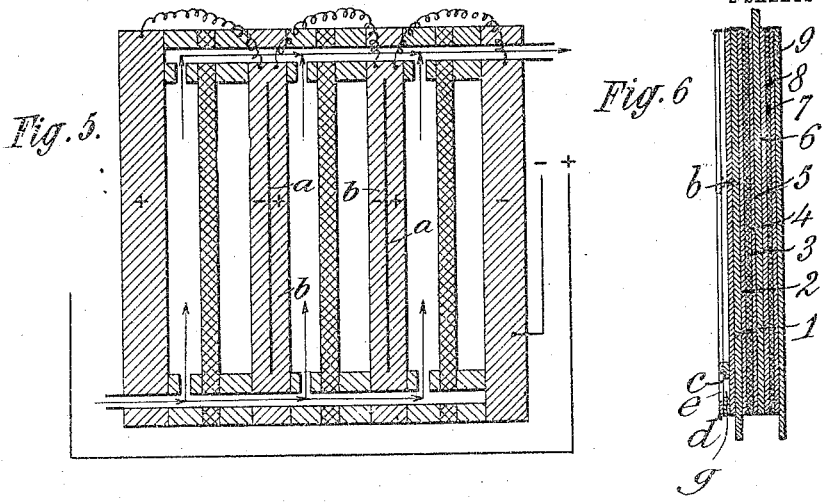
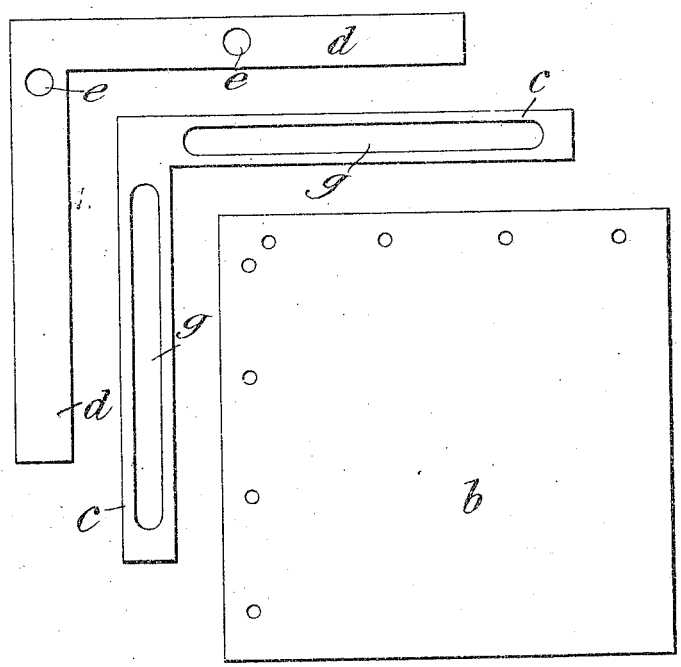

UNITED STATES PATENT OFFICE.

LUCIEN PAUL BASSET, OF ENGHIEN, FRANCE.

ELECTRIC BATTERY.

No. 913,936.        Specification of Letters Patent.        Patented March 2, 1909.

Application filed September 30, 1907. Serial No. 395,235.

*To all whom it may concern:*

Be it known that I, LUCIEN PAUL BASSET, a citizen of the Republic of France, residing in Enghien, Seine-et-Oise, France, have invented certain new and useful Improvements in Electric Batteries, of which the following is a specification.

This invention relates to an electric battery in which the heat energy liberated by exothermic reactions is transformed into electrical energy.

Two reactions occur in this generator. The first is due to the electrolysis of a solution of sulfurous acid in dilute sulfuric acid, which gives rise to the formation of sulfuric acid and liberation of hydrogen as ions; the second consists in the oxidation of this ionic hydrogen in sulfuric acid as an electrolyte by a suitable oxidant, such as nitrous acid, or any other oxidizing agent capable of like alternate reduction and oxidation. The first of these reactions, which is the result of electrolysis, is slightly endothermic, while the second is strongly exothermic and the heat thus rendered available is converted into electricity.

The reactions may be expressed by the following equations:—

I. $H_2SO_3 + SO_2 + 2H_2O = 2H_2SO_4 + H_2 + q.$

II. $NO_2 + H_2SO_4 + H_2 = H_2O + NO + H_2SO_4 + q'.$

In these equations hydrogen is formed in the state of ions. The reactions may be summed in one equation:—

III. $SO_2 + NO_2 + H_2O = H_2SO_4 + NO + \dfrac{q' + q}{Q}.$

For the sake of simplicity $NO_2$ has been represented in these equations instead of nitrous acid.

To realize the reactions there may be used an apparatus comprising a number of compartments connected in parallel or in series, and separated by porous partitions allowing free passage to hydrogen ions. Immersed in each compartment is an anode or current collector of a material, such as carbon, not attacked by the electrolyte or the substances dissolved therein.

The foregoing equations, particularly III, show that the electric generator produces sulfuric acid and nitric oxid. The latter is readily converted into nitric peroxid, for example by causing it to pass through a column of coke in company with a current of air; the nitric peroxid or other nitrogen oxids thus formed are then dissolved in the electrolyte to be returned to the generator. The sulfuric acid may be re-converted into sulfurous acid by reduction by carbon or sulfur in known manner. It may, however, be more advantageous to sell the sulfuric acid and to supply sulfurous acid by burning pyrites as is usual in the manufacture of sulfuric acid.

The invention is illustrated in the accompanying drawings wherein—

Figure 1 shows separately and in their order the carbon plates, the frames made of insulating material and the porous plates, which when juxtaposed form the generator. Fig. 2 is a transverse section through a battery, the arrangement being such that both electric current and electrolyte flow through the chambers in series. Fig. 3 shows the parts constituting a cell. Fig. 4 is a transverse vertical section through a battery in which both the electric current and the electrolyte flow in parallel, while Fig. 5 is a like section of a battery in which the electric current flows in series while the electrolyte flows in parallel. Fig. 6 is a transverse section through a group of juxtaposed elements constituting a battery; Fig. 7 is a side elevation of the details of the battery. Fig. 8 is a diagram representing the circulation of the two liquids. Fig. 9 is a section through a split plate of carbon having an insulating plate inserted in it.

In order to insure a circulation as effective as possible, the two liquids or electrolytes are caused to travel transversely with respect to each other in compartments or cells as narrow as possible, this arrangement having the additional advantage that the dimensions of the battery are comparatively small.

A cell is constituted by two carbons, a positive and a negative, in the form of plates 1 and 5, between which are two frames of insulating material such as celluloid, 2 and 4, themselves separated by a porous partition 3 of faience or other suitable material. The carbon plates, frames and partitions are all made as thin as possible so that the cell may be very narrow and the resistance of the porous partition and of the electrolyte may be as small as possible; the two frames 2 and 4 are for the purpose of providing the two compartments of the cell, one for each of the circulating liquids. When the cells are to be connected in parallel this order of the parts may be repeated indefinitely, and in this case each carbon plate, as shown in Fig. 4, serves as positive electrode or as negative electrode for the neighboring cells; when the connection is in series either two carbon electrodes are juxtaposed with a suitable sheet of insulating material between them and then connected in such a manner that a positive is always connected with a negative, or, as shown in Figs. 2 and 5, a carbon plate may be slit longitudinally throughout nearly the whole of its length, a very thin plate of insulating material being inserted in the slit so that there are practically two carbon plates connected together by the part of the original plate which has not been slit.

In order to insure the circulation of the liquids in directions at right angles to each other, and the supply of the two liquids, the carbon plates 1, 5, 9, etc. of the frames 2, 4, 6, 8, etc. and the porous partitions 3, 7, etc. are suitably perforated. The two liquids must always circulate separately. At each end of the battery is a plate $b$ of insulating material, Figs. 6 and 7, perforated correspondingly with the carbon plate against which it rests and to each plate $b$ is applied an angular piece $c$ having slots in it, Figs. 6 and 7. Against each angular piece $c$ is held a like piece $d$ perforated for passage of the two liquids.

The circulation occurs in the following manner, as indicated in Fig. 8, wherein, for the sake of clearness, the separating frames are not represented:—The positive liquid, containing nitrous acid, is indicated by the full lines; it enters at the lower part of carbon 1, through the perforations therein, and passing through the grooves indicated in the lower part of frame 2 rises between the carbon 1 and the porous partition 3; it then passes through the perforations in the upper part of the latter, and those in the upper part of frame 4 and carbon 5, to descend through frame 6 between carbon 5 and porous partition 7. From this chamber the liquid then passes through the lower part of carbon 7, frame 8, and carbon 9 to ascend between the latter and partition 11. Finally it escapes through the upper part of partition 11, the following frame and carbon 13. The negative liquid, indicated in dotted lines, circulates in a direction at right angles to the first in the intermediate compartments. It passes through the perforations on the left hand of carbon 1, frame 2, partition 3 and grooves in frame 4, travels across the compartment formed within the latter and then passes through the grooves on the right hand of this frame and the perforations on the right hand of carbon 5, frame 6, and partition 7, and through the grooves on the right hand of frame 8 to travel across the compartment between the partition 7 and carbon 9, and so on. Thus the two liquids flow in directions at right angles to each other. In Fig. 2 the circulation is the same, the ducts for one liquid being shown in full lines at $e$ and those for the other in dotted lines at $f$. In this case the cells are shown in series, the carbons 5, 9 being at the same time both positive and negative, having inserted in them insulating plates $a$ of celluloid or other suitable material. The end carbons of the battery may have collecting slots $g$ serving for the entrance and exit respectively of the liquids.

In Fig. 4 the cells are shown in parallel, the carbon plates being each of one polarity only. In this case the liquids also circulate in parallel, duct $h$ serving for admission of the liquid and duct $k$ for the outflow thereof.

In Fig. 5 the liquids circulate in parallel but the carbons are connected in series, each having double polarity and being provided with an internal insulating plate.

Having thus described the nature of my said invention and the best means I know of carrying the same into practical effect, I claim:—

1. An electric battery carrying two solutions, first a solution of sulfurous acid in sulfuric acid, and the second a solution of nitrous acid in sulfuric acid, and arranged to electrolyze the first solution to form sulfuric acid and hydrogen ions and to cause the hydrogen ions to coact with said second solution to form water and nitric oxid.

2. An electric battery composed of thin plates of carbon, thin plates of porous material interposed between the said plates of carbon, thin frames of insulating material interposed between the said plates of porous material and the said plates of carbon, all the said plates and frames being perforated to adapt them for the circulation of two liquids through the compartments formed by the said frames, one liquid circulating through the compartments of odd number and the other through those of even number, the passage of the liquids being in directions at right angles to each other, substantially as described.

3. An electric battery composed of thin plates of carbon, an insulating plate inserted in each carbon plate so as to adapt the said plate to serve both as positive and negative plates connected electrically together, plates of porous material interposed between the said plates of carbon, thin frames of insulating material interposed between the said plates of porous material and the said plates of carbon, all the said plates and frames being perforated to adapt them for the circulation of two liquids through the compartments formed by the said frame, one liquid circulating through the compartments of odd number and the other through those of even number, the passage of the liquid being in directions at right angles to each other, substantially as described.

In witness whereof I have hereunto signed my name this 19th day of September 1907, in the presence of two subscribing witnesses.

LUCIEN PAUL BASSET.

Witnesses:
　H. C. COXE,
　GABRIEL BELLIARE.